M. A. HOLZMAN.
SAFETY DEVICE FOR SELF PROPELLED VEHICLES.
APPLICATION FILED AUG. 2, 1912.
1,094,901.
Patented Apr. 28, 1914.
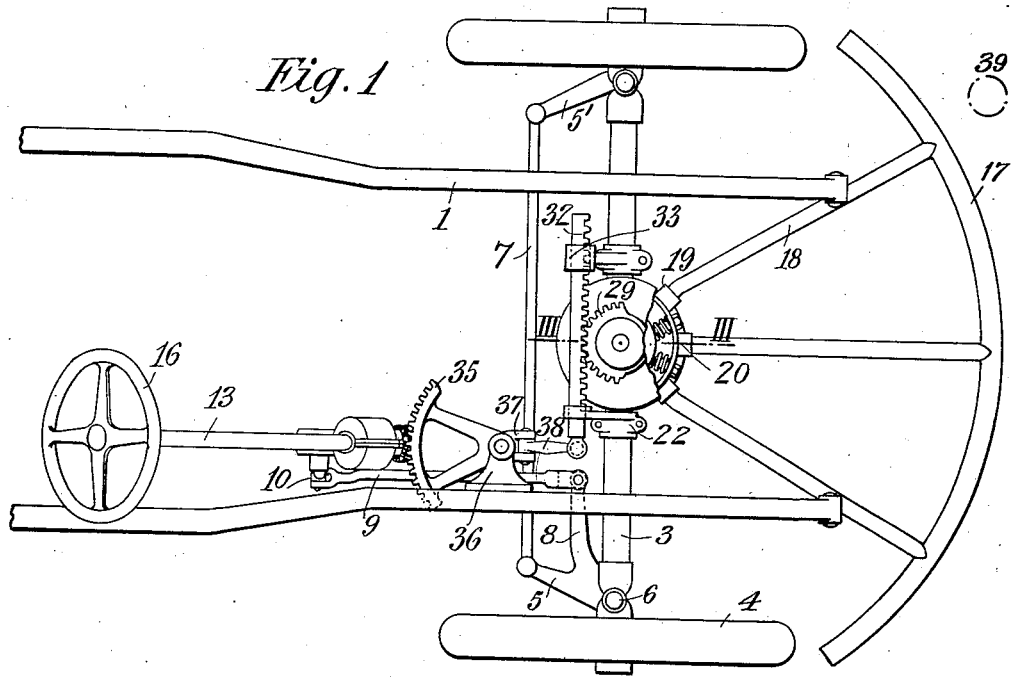
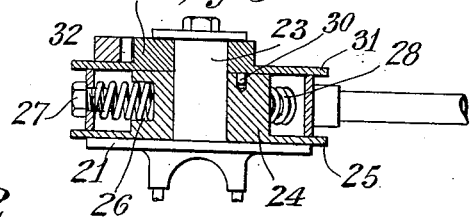
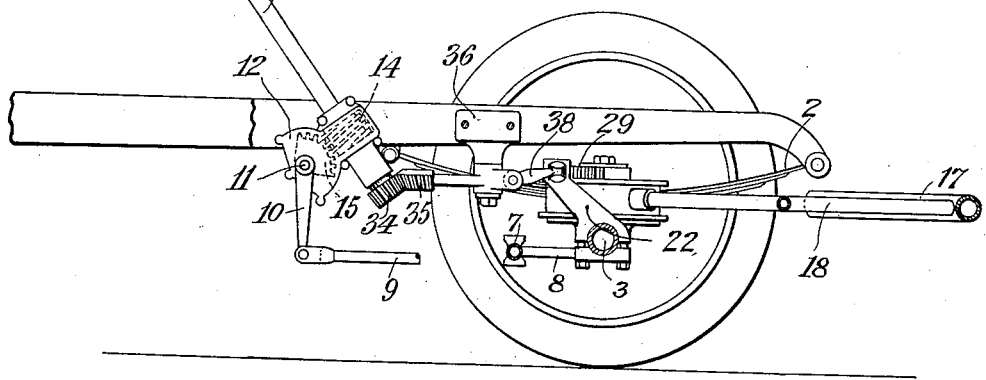
Witnesses:
Florence E. Manuel.
Raphaël Netter.
Morris A. Holzman Inventor
By his Attorney
Samuel C. Yeaton

UNITED STATES PATENT OFFICE.

MORRIS A. HOLZMAN, OF NEW YORK, N. Y.

SAFETY DEVICE FOR SELF-PROPELLED VEHICLES.

1,094,901.  Specification of Letters Patent.  Patented Apr. 28, 1914.

Application filed August 2, 1912. Serial No. 712,885.

*To all whom it may concern:*

Be it known that I, MORRIS A. HOLZMAN, a citizen of the United States, residing at 1632 Amsterdam avenue, in the city, county, and State of New York, have invented certain new and useful Improvements in Safety Devices for Self-Propelled Vehicles, of which the following is a specification.

My invention relates to safety devices for self propelled vehicles and the primary object is to provide means which will be operated by an obstruction in the path of the vehicle, thereby steering the vehicle away from the obstruction and thus avoiding the accident that would otherwise occur.

My invention considered broadly comprises a guard which extends in advance of the vehicle and which is connected to the steering mechanism so that when any obstructions appear in the road, the guard will be struck first and will be turned to one side, thereby instantly operating the steering gear to turn the vehicle away from the obstacle to a place of safety.

The various other objects of the invention will be more fully set forth in the following description of one form of mechanism embodying the invention which consists in the new and novel features of construction and combinations of parts hereinafter set forth and claimed.

Referring to the accompanying drawings: Figure 1 is a plan view of my invention and a fragmental plan view of the running gear of an automobile with which it is used. Fig. 2 is a side elevational view of Fig. 1 partly in section, and Fig. 3 is a detailed sectional view through the line 3—3 of Fig. 1.

My invention may be used with any type of vehicle, it only being necessary that it be changed in such minor details as will accommodate it to the particular type desired. In the present instance a fragmental front part of a running gear and steering mechanism of usual construction is shown, comprising the longitudinal supports 1, the springs 2, the front axle 3, and the wheels 4.

The steering gear is of usual construction and comprises arms 5 and 5' secured to the knuckles 6 on which the front wheels turn, and are connected together by a bar 7. Another arm 8 is secured with one of the arms, as the arm 5, and is pivotally connected to a rod 9. This rod is pivotally secured to an arm 10, which is secured on the shaft 11 mounted in the bracket 12, secured to the frame of the vehicle. An inclined steering post 13 passes through the bracket 12 and has a worm 14 mounted upon it. The worm is in mesh with a segmental gear 15 secured on the shaft 11. An operating wheel 16 is secured on the upper end of the steering post 13.

The safety device comprising my invention includes a guard 17, which is preferably formed in the arc of a circle, but other suitable shapes may be given it. Spokes 18 are secured at their outer ends to the guard and have their inner ends fixed in sockets 19 formed on a circular band 20. A disk plate 21 is secured to the shaft 3 by means of the clamps 22, and has a vertical post 23 extending from it on which is mounted a hub 24. The hub has a flange 25 projecting from its lower edge, which serves to support the band 20. The hub has a plurality of sockets 26 formed in its periphery; and an equal number of screws 27 are tapped through the band 20. Springs 28 are arranged with their outer ends passed over the ends of the screws 27 and their inner end seated in the sockets 26. A segmental gear 29 is secured to the hub 24 as by means of a pin 30. It has a peripheral flange 31 extended to overlap the band 20. The band is thus confined between the two flanges 25 and 31, but is free to rotate independent of them.

A rack bar 32 is slidably mounted in guide-ways 33 preferably formed on the clamps 22 and is in mesh with the segmental gear 29. A beveled gear 34 is secured on the end of the steering rod 13 and is in mesh with a segmental beveled gear 35, which is rotatably secured to a bracket 36. A bifurcated lug 37 is formed on the segmental gear 35 to extend rearwardly thereof, and a link 38 is pivotally secured at one end between the bifurcations and at the other end to the rack 32.

The operation of the device is as follows:—When the vehicle is headed toward an obstruction such for instance as a telegraph pole represented diagrammatically by the dotted lines 39, the guard 17 being the most advanced point of the vehicle and of sufficient width to include both wheels, is the first to be struck by the pole. The impact operates to turn the guard in a direction toward the pole as the vehicle advances. The spring connections 28 serve to take up whatever shock there may be and to provide a yielding connection between the band 20 and the hub 24, so that the hub will revolve with the turning of the guard 17. This will operate to turn the segmental gear 29, thereby moving the rack 32. This swings the segmental gear 35 thereby turning the gear 34 with it. By this means the post 13 is turned, thereby operating the steering gear in the usual way. The connections are such that the wheels 4 will be turned to carry the vehicle away from the obstruction and the relative sizes of the connecting gears are designed to cause a small displacement of the guard 17 to produce the required degree of turning of the wheels to safely steer the vehicle free of the obstruction. After this is done, the driver immediately turns the handle 16 and directs the vehicle on its intended course. When the obstruction is easily movable as for instance when a person is struck by the guard 17, he is carried with the turning guard out of the path of the vehicle at the same time that the vehicle wheels are steered in the opposite direction. The guard 17 and its accompanying parts may be mounted on the post 23 free from connection with any steering gear, as for instance when used with electric cars which run on a track and wherein a steering gear is unnecessary. In such cases a person standing in front of a moving car will be struck by the guard 17, and as it turns will carry him to one side out of danger. The guard when thus used is made sufficiently wide to carry the person struck beyond the tracks.

Although I have shown only one form of mechanism embodying my invention, it is obvious that various changes within the skill of the mechanic may be made therein without departing from the spirit of the invention, provided the means set forth in the following claims are employed.

Having thus described my invention, I claim:—

1. In a safety device for self propelling vehicles, a guard comprising a bar extending entirely across the front of the vehicle having converging spokes rigidly secured thereto, a mount for the guard at the converging ends of the spokes and positioned midway between the front wheels of the vehicle to confine the bar to a rotary movement about a fixed axis at the converging ends of the spokes simultaneous with its encountering an obstruction, and means operably connecting the guard at its axis of rotation with the steering mechanism of the vehicle for turning the vehicle away from the obstruction when the obstruction and guard meet.

2. In a safety device for self propelled vehicles, a guard comprising a bar extending entirely across the front of the vehicle having converging spokes rigidly secured thereto, a mount for the guard at the converging ends of the spokes and positioned midway between the front wheels of the vehicle to confine the bar to a rotary movement about a fixed axis simultaneous with its encountering an obstruction and yielding means operably connecting the guard at its axis of rotation with the steering mechanism of the vehicle for turning the vehicle away from the obstruction when the obstruction and bar meet.

This specification, signed and witnessed this 1st day of Aug., A. D., 1912.

MORRIS A. HOLZMAN.

Witnesses:
M. P. WINNE,
F. E. MANUEL.

Copies of this patent may be obtained for five cents each, by addressing the "Commissioner of Patents, Washington, D. C."